United States Patent
Kubota et al.

(10) Patent No.: US 9,948,797 B2
(45) Date of Patent: Apr. 17, 2018

(54) DISPLAYING HELP FILES ON TWO DISPLAY UNITS IN AN IMAGE FORMING SYSTEM

(71) Applicant: FUJI XEROX CO., LTD., Tokyo (JP)

(72) Inventors: Kosuke Kubota, Kanagawa (JP); Eri Sato, Kanagawa (JP); Hosana Kimura, Kanagawa (JP); Hiroshi Shiota, Kanagawa (JP); Masateru Hattori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/096,737

(22) Filed: Apr. 12, 2016

(65) Prior Publication Data
US 2017/0134597 A1 May 11, 2017

(30) Foreign Application Priority Data
Nov. 11, 2015 (JP) ................................. 2015-221511

(51) Int. Cl.
*H04N 1/00* (2006.01)

(52) U.S. Cl.
CPC ..... *H04N 1/00411* (2013.01); *H04N 1/00427* (2013.01); *H04N 1/00464* (2013.01); *H04N 1/00477* (2013.01)

(58) Field of Classification Search
CPC ........... H04N 1/00411; H04N 1/00427; H04N 1/00477; H04N 1/00464
See application file for complete search history.

(56) References Cited

U.S. PATENT DOCUMENTS

| 2012/0212786 A1* | 8/2012 | Nishiura | ............ | H04N 1/00411 358/3.24 |
| 2014/0029049 A1* | 1/2014 | Takahashi | .......... | H04N 1/00973 358/1.15 |

FOREIGN PATENT DOCUMENTS

| JP | 2002-123349 A | 4/2002 |
| JP | 2002-215578 A | 8/2002 |

* cited by examiner

*Primary Examiner* — Eric A Rust
(74) *Attorney, Agent, or Firm* — Oliff PLC

(57) ABSTRACT

An information processing system includes a first display unit, a second display unit, and a control unit. If the first display unit that displays first operating instruction information indicating explanation of an operation receives an instruction to display second operating instruction information indicating explanation of a next operation, the control unit displays the second operating instruction information on the second display unit, and hides the first operating instruction information that is displayed on the first display unit.

4 Claims, 10 Drawing Sheets

DISPLAYING HELP FILES ON TWO DISPLAY UNITS IN AN IMAGE FORMING SYSTEM

CROSS-REFERENCE TO RELATED APPLICATIONS

This application is based on and claims priority under 35 USC 119 from Japanese Patent Application No. 2015-221511 filed Nov. 11, 2015.

BACKGROUND

(i) Technical Field

The present invention relates to an information processing system, an information processing apparatus, and a non-transitory computer readable medium.

(ii) Related Art

Operating instruction information indicating explanation of operations that can be performed on a display unit (for example, a help file) may be displayed on the display unit.

SUMMARY

According to an aspect of the invention, an information processing system includes a first display unit, a second display unit, and a control unit. If the first display unit that displays first operating instruction information indicating explanation of an operation receives an instruction to display second operating instruction information indicating explanation of a next operation, the control unit displays the second operating instruction information on the second display unit, and hides the first operating instruction information that is displayed on the first display unit.

BRIEF DESCRIPTION OF THE DRAWINGS

Exemplary embodiments of the present invention will be described in detail based on the following figures, wherein.

DETAILED DESCRIPTION

Figure 1:
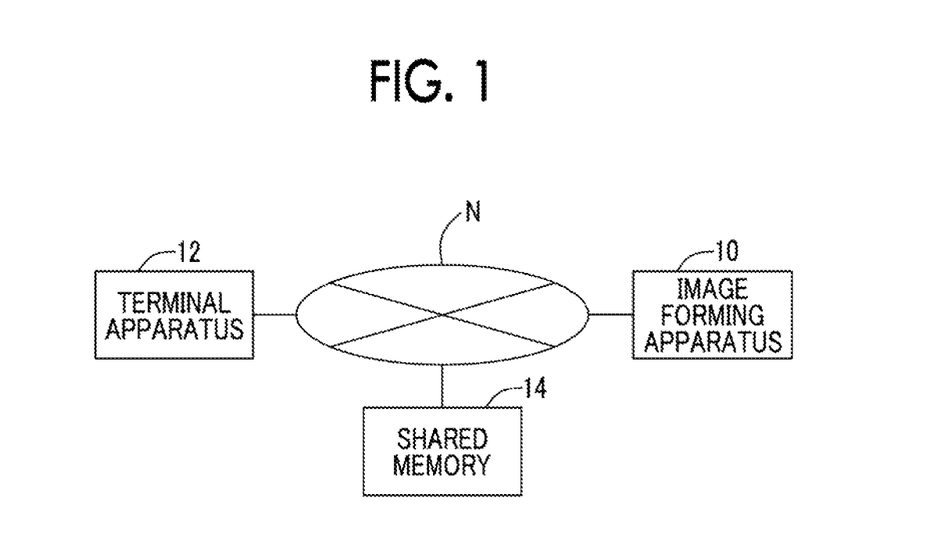
FIG. 1 is a block diagram illustrating an image forming system according to an exemplary embodiment of the present invention.

FIG. 1 illustrates an example of an image forming system as an information processing system according to an exemplary embodiment of the present invention. The image forming system includes, for example, an image forming apparatus 10, a terminal apparatus 12, and a shared memory 14.

The image forming apparatus 10, the terminal apparatus 12, and the shared memory 14 are connected to, for example, a communication path N such as a local area network (LAN). The communication path N is realized by, for example, short distance wireless communication such as Wi-Fi. For example, the access point for Wi-Fi communication is provided in the image forming apparatus 10, and the communication path N is formed by the access point. Of course, the access point may be provided in an apparatus other than the image forming apparatus 10 or at a location other than the location of the image forming apparatus 10.

The image forming apparatus 10 is an apparatus provided with at least one function out of a copy function, a print function, a scan function, and a facsimile function. Furthermore, the image forming apparatus 10 has a short distance wireless communication function such as Wi-Fi, and a function of transmitting and receiving data to and from other apparatuses. The image forming apparatus 10 may include a function of being connected to a communication path such as the Internet.

The terminal apparatus 12 is an apparatus such as a personal computer (PC), a tablet PC, a smart phone, and a mobile phone. The terminal apparatus 12 is used by a user, for example, at the time of execution of a process by the image forming apparatus 10. The terminal apparatus 12 has, for example, a short distance wireless communication function such as Wi-Fi, and a function of transmitting and receiving data to and from other apparatuses. The terminal apparatus 12 may have a function of connecting to the communication path such as the Internet. In addition, the image forming apparatus 10 and the terminal apparatus 12 respectively correspond to an example of the information processing apparatus.

The shared memory 14 is connected to the communication path N, and is a storage device to which access from the image forming apparatus 10 and the terminal apparatus 12 is permitted. In addition, the shared memory 14 may be provided in the image forming apparatus 10. For example, each of the image forming apparatus 10 and the terminal apparatus 12 regularly accesses the shared memory 14, and checks information that is stored in the shared memory 14. As another example, every time the information stored in the shared memory 14 is updated, information indicating the update is broadcasted, and the image forming apparatus 10 or the terminal apparatus 12 that has received the information may access the shared memory 14, and checks the information that is stored in the shared memory 14.

Figure 2:
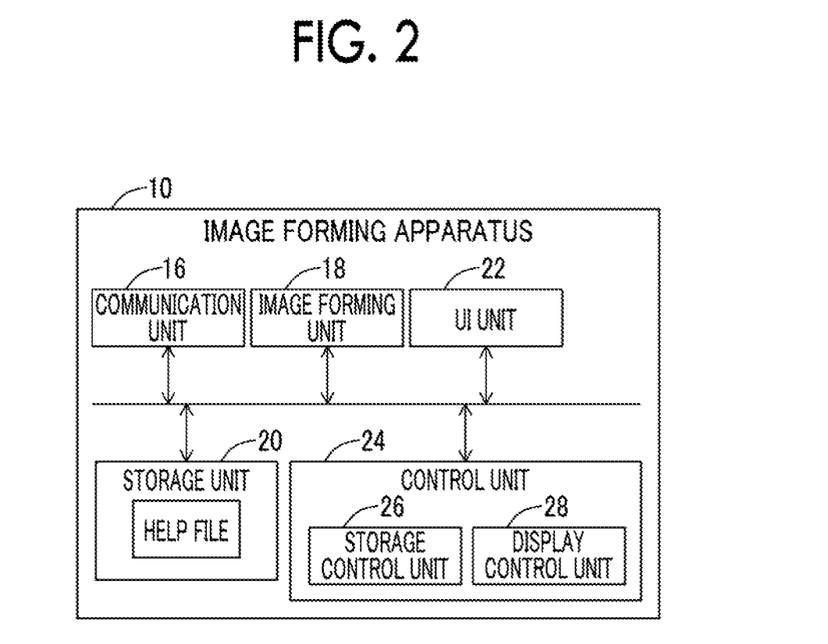
FIG. 2 is a block diagram illustrating an image forming apparatus.

Hereinafter, the details of the configuration of the image forming apparatus 10 will be described with reference to FIG. 2. FIG. 2 illustrates the configuration of the image forming apparatus 10.

A communication unit 16 is a communication interface, and has a function of transmitting data to other apparatuses and a function of receiving data from other apparatuses. The communication unit 16 has a short distance wireless communication function such as Wi-Fi, and transmits and receives data through the communication path N using the communication function. The communication unit 16 may have a function of connecting to the communication path such as the Internet. For example, the image data and the like are transmitted to the terminal apparatus 12 by the communication unit 16, and the communication unit 16 receives the image data, the control data, and the like, which are transmitted from the terminal apparatus 12.

An image forming unit 18 has a function of performing a process regarding image formation. For example, a copy process, a print process, a scan process, a facsimile process, and the like are performed by the image forming unit 18. Documents are copied in the copy process. An image is printed on a recording medium such as a sheet of paper in the print process. Image data is generated by a document being read in the scan process. Image data is transmitted or received by a facsimile in the facsimile process.

For example, image data to be printed is transmitted from the terminal apparatus 12 to the image forming apparatus 10, through the communication path N, and an image based on the image data is printed on a sheet of paper by the image forming unit 18. Furthermore, image data generated through the scan process by the image forming unit 18 is transmitted from the image forming apparatus 10 to the terminal apparatus 12, through the communication path N. For example, such a function is realized, by installing application software for executing the process for image formation in the terminal apparatus 12.

A storage unit 20 is a storage device such as a hard disk. The storage unit 20 stores, for example, data to be printed, data generated through the scan process, software, and the like.

Furthermore, the storage unit 20 stores help files. The help files are operating instruction information indicating explanation of operations on the image forming apparatus 10 and the terminal apparatus 12 with respect to a print process, a scan process (a scan transfer process), Wi-Fi connection settings, and the like. For example, the help file regarding the print process is information indicating explanation of an operation that is to be performed when the print process is executed using the terminal apparatus 12. Specifically, the help file regarding the print process is information indicating explanation of an operation which is to be performed when data to be printed is transmitted from the terminal apparatus 12 to the image forming apparatus 10 for print. The help file regarding the scan process is information indicating explanation of an operation that is to be performed when the scan process is executed using the terminal apparatus 12. Specifically, the help file regarding the scan process is information indicating explanation of an operation that is to be performed when the scan process is executed in the image forming apparatus 10 and image data that is generated through the scan process is transmitted from the image forming apparatus 10 to the terminal apparatus 12. The help file regarding the Wi-Fi connection settings is information indicating explanation of an operation that is to be performed when Wi-Fi communication is used with the terminal apparatus 12.

Explanation in the help file is divided into plural explanation portions, for example, by units of pages, chapters, sections, and the like. Each explanation portion is associated in advance with operation content identification information (operation screen identification information) indicating operation content (for example, an operation screen corresponding to the operation contents) that is a target of the explanation. For example, the explanation portion regarding the print process is associated with the operation content identification information indicating the print process, and the explanation portion regarding the scan process is associated with the operation content identification information indicating the scan process.

In addition, each explanation portion is associated in advance with display device identification information indicating a display device that is to display the explanation portion (the image forming apparatus 10 or the terminal apparatus 12). In this exemplary embodiment, information indicating explanation of an operation on the image forming apparatus 10 is information that is to be displayed on the terminal apparatus 12. Also, information indicating explanation of an operation on the terminal apparatus 12 is information that is to be displayed on the image forming apparatus 10. Therefore, in the explanation in the help file, portions indicating explanation of operations on the image forming apparatus 10 are associated with display device identification information that indicates the terminal apparatus 12 as a display device, and portions indicating explanation of operations on the terminal apparatus 12 are associated with display device identification information that indicates the image forming apparatus 10 as a display device.

A UI unit 22 is a user interface, and includes a display unit and an operation unit. The display unit is a display device such as a liquid crystal display, and the operation unit is an input device such as an operation panel or a touch panel.

A control unit 24 has a function of controlling the operation of each unit of the image forming apparatus 10. In addition, the control unit 24 includes a storage control unit 26 and a display control unit 28.

In a case where the UI unit 22 of the image forming apparatus 10 receives an instruction to display the help file, the storage control unit 26 specifies the explanation portion corresponding to the operation screen that is displayed on the UI unit 22 (display location) (the operation content corresponding to the operation screen), in the help file that is stored in the storage unit 20, and acquires display device identification information associated with the explanation portion (identification information indicating a display device that is to display the explanation portion) from the help file. Then, the storage control unit 28 writes into the shared memory 14 the operation content identification information (operation screen identification information) indicating the operation content corresponding to the operation screen that is displayed on the UI unit 22 (display location) and the display device identification information which is acquired from the help file, in association with each other.

The display control unit 28 has a function of displaying a help file on the UI unit 22 in a case where display device identification information indicating the image forming apparatus 10 (own apparatus) is stored in the shared memory 14. Specifically, the display control unit 28 refers to the operation content identification information associated with the display device identification information and displays on the UI unit 22 the explanation portion which is in the help file stored in the storage unit 20 and which is associated with the operation content identification information (pages, chapters, sections, and the like in the help file).

Figure 3:
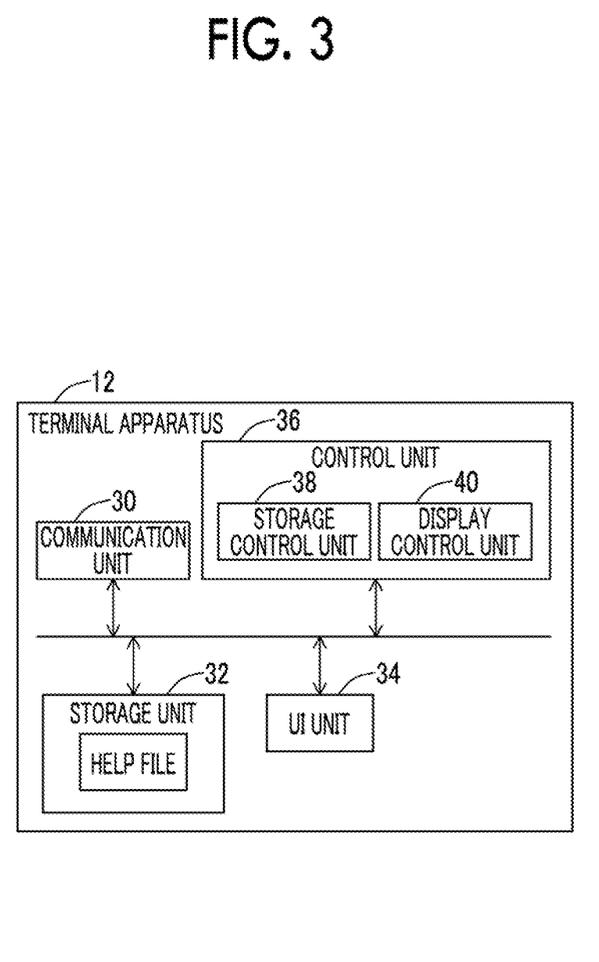
FIG. 3 is a block diagram illustrating a terminal apparatuses.

Hereinafter, the details of the configuration of the terminal apparatus 12 will be described with reference to FIG. 3. FIG. 3 illustrates the configuration of the terminal apparatus 12.

A communication unit 30 is a communication interface having a short distance communication function such as Wi-Fi. The communication unit 30 has a function of transmitting data to other apparatuses through the communication path N and a function of receiving data from other apparatuses through the communication path N. The communication unit 30 may have a function of connecting to the communication path such as the Internet. For example, image data, control data, and the like are transmitted to the image forming apparatus 10 by the communication unit 30, and the communication unit 30 receives the image data and the like, transmitted from the image forming apparatus 10.

A storage unit 32 is a storage device such as a hard disk. The storage unit 32 stores, for example, image data, software, and the like.

The storage unit 32 stores help files. The help files are operating instruction information indicating explanation of operations on the image forming apparatus 10 and the terminal apparatus 12 with respect to a print process, a scan process (a scan transfer process), Wi-Fi connection settings, and the like, similar to the help files stored in the image forming apparatus 10.

Explanation in the help file is divided into plural explanation portions, for example, by units of pages, chapters, sections, and the like. Each explanation portion is associated in advance with operation content identification information (operation screen identification information) indicating operation content that is a target of the explanation (for example, an operation screen corresponding to the operation content).

In addition, each explanation portion is associated in advance with display device identification information indicating a display device that is to display the explanation portion (the image forming apparatus 10 or the terminal apparatus 12). For example, in the explanation in the help file, portions indicating explanation of operations on the image forming apparatus 10 are associated with display device identification information that indicates the terminal apparatus 12 as a display device, and portions indicating explanation of operations on the terminal apparatus 12 are associated with display device identification information that indicates the image forming apparatus 10 as a display device.

A UI unit 34 is a user interface, and includes a display unit and an operation unit. The display unit is, for example, a display device such as a liquid crystal display. The operation unit is, for example, an input device such as a touch panel, and a keyboard.

A control unit 36 has a function of controlling the operation of each unit of the terminal apparatus 12. In addition, the control unit 36 includes a storage control unit 38 and a display control unit 40.

In a case where the UI unit 34 of the terminal apparatus 12 receives an instruction to display the help file, the storage control unit 38 specifies the explanation portion corresponding to the operation screen that is displayed on the UI unit 34 (the operation content corresponding to the operation screen), in the help file that is stored in the storage unit 32, and acquires display device identification information associated with the explanation portion (identification information indicating a display device that is to display the explanation portion) from the help file. Then, the storage control unit 38 writes into the shared memory 14 the operation content identification information (operation screen identification information) indicating the operation content corresponding to the operation screen that is displayed on the UI unit 34 and the display device identification information which is acquired from the help file, in association with each other.

The display control unit 40 has a function of displaying a help file on the UI unit 34 in a case where display device identification information indicating the terminal apparatus 12 (own apparatus) is stored in the shared memory 14. Specifically, the display control unit 40 refers to the operation content identification information associated with the display device identification information and displays on the UI unit 34 the explanation portion which is in the help file stored in the storage unit 32 and which is associated with the operation content identification information (pages, chapters, sections, and the like in the help file).

Figure 4:
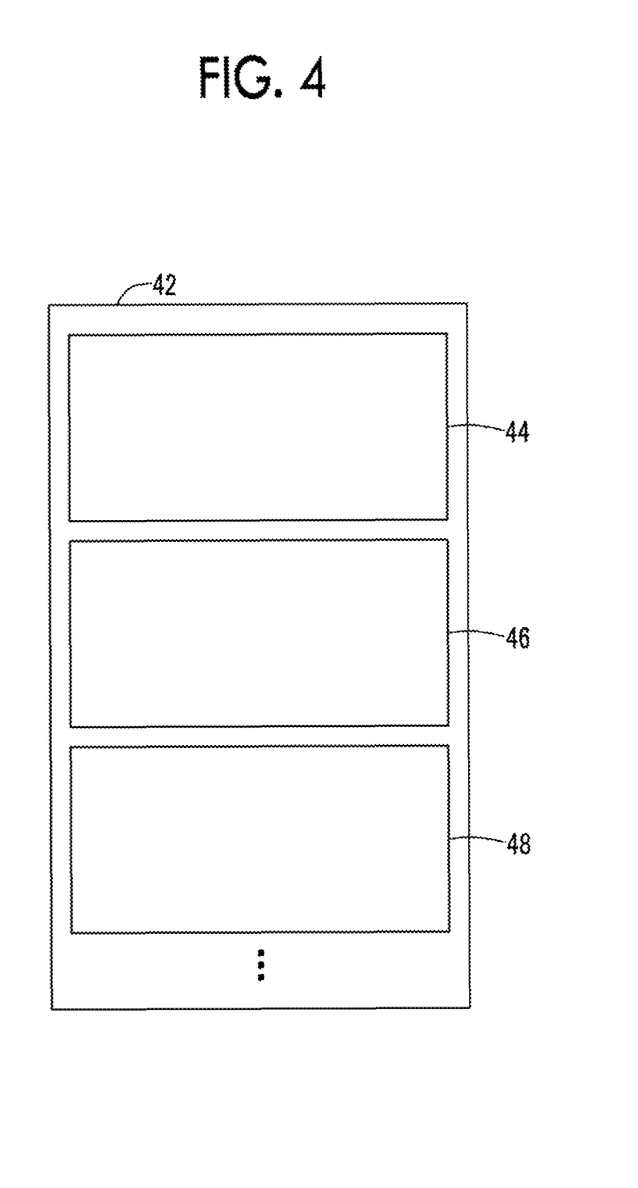
FIG. 4 is a diagram illustrating a configuration of a help file.

Hereinafter, details of the image forming system according to the present exemplary embodiment will be described. FIG. 4 illustrates an example of the configuration of the help file. A help file 42 is information stored in the image forming apparatus 10 and the terminal apparatus 12. Explanation in the help file 42 is divided into plural explanation portions (explanation portions 44, 46, 48, . . . ), for example, by units of pages, chapters, sections, and the like. Each explanation portion is associated in advance with the operation content identification information (operation screen identification information) indicating the operation content that is a target of the explanation (for example, the operation screen corresponding to the operation content). Furthermore, each explanation portion is associated in advance with the display device identification information indicating a display device that is to display the explanation portion (the image forming apparatus 10 or the terminal apparatus 12). For example, the explanation portion 44 is a portion indicating explanation of an operation that is to be performed on the image forming apparatus 10 at the time of the print process. The explanation portion 44 is associated with the display device identification information indicating the terminal apparatus 12 as the display device and the operation content identification information indicating the print process (operation screen identification information indicating the operation screen that is displayed on the image forming apparatus 10 at the time of the print process). Furthermore, the explanation portion 46 is a portion indicating explanation of an operation that is to be performed on the terminal apparatus 12 at the time of the print process. The explanation portion 46 is associated with the display device identification information indicating the image forming apparatus 10 as the display device and the operation content identification information indicating the print process (operation screen identification information indicating the operation screen that is displayed on the terminal apparatus 12 at the time of the print process). A device that is to display an explanation portion is specified by referring to the display device identification information, and the operation content (operation screen) that is the target of the explanation is specified by referring to the operation content identification information.

Figure 5:
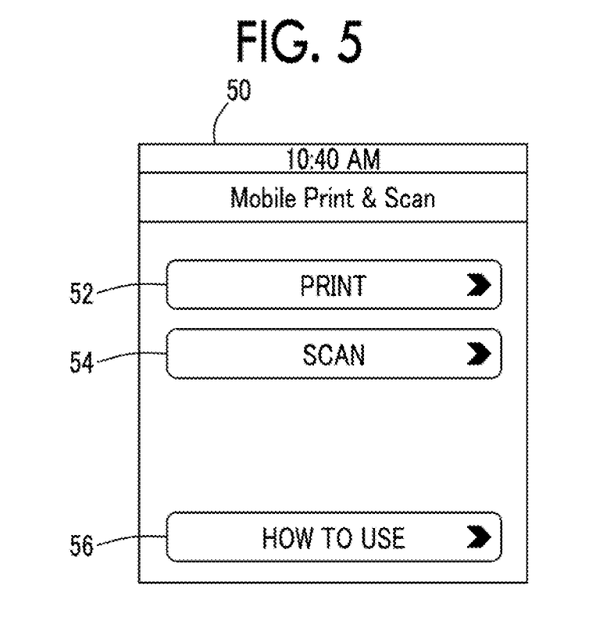
FIG. 5 is a diagram illustrating a menu screen.

Hereinafter, the menu screen that is displayed on the terminal apparatus 12 will be described with reference to FIG. 5. FIG. 5 illustrates an example of the menu screen. For example, if a dedicated application that is installed in the terminal apparatus 12 is started, the control unit 36 of the terminal apparatus 12 displays a menu screen 50 on the UI unit 34 of the terminal apparatus 12. In the example illustrated in FIG. 5, the menu screen 50 is configured so that a user can specify either of execution of the print process or execution of the scan process (scan transfer process) on the menu screen 50. As an example, a print button 52, a scan button 54, and a help button 56 are displayed on the menu screen 50. If the print button 52 is pressed by the user, the execution of the print process is instructed. In this case, image data to be printed that is selected by the user is transmitted from the terminal apparatus 12 to the image forming apparatus 10 through the communication path N. In the image forming apparatus 10, the image forming unit 18 prints an image on a sheet of paper based on image data to be printed. If the scan button 54 is pressed by the user, the execution of the scan process (scan transfer process) is instructed. In this case, the scan process is executed by the image forming unit 18, and the image data generated through this scan process is transmitted from the image forming apparatus 10 to the terminal apparatus 12 through the communication path N. If the help button 56 is pressed by the user, the help menu screen is displayed on the UI unit 34 of the terminal apparatus 12. For example, the screen transitions from the menu screen 50 to the help menu screen. It is noted that the menu screen 50 illustrated in FIG. 5 is only an example. The menu screen 30 may be configured so that a user can instruct the execution of another function (process) through the menu screen 50.

Figure 6:
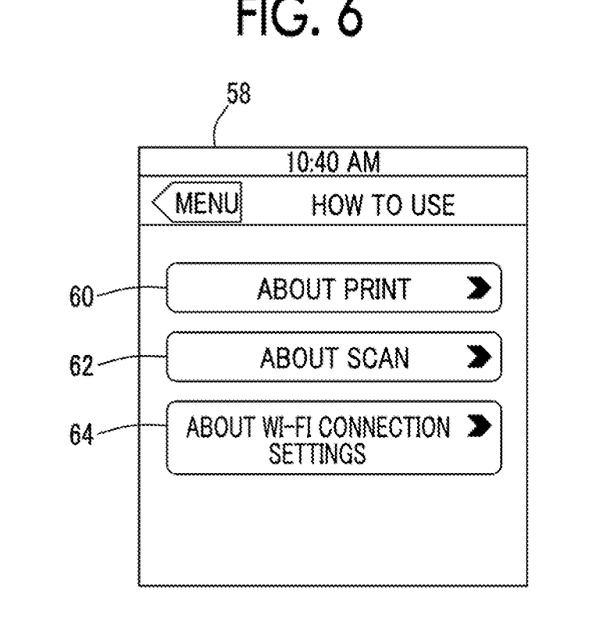
FIG. 6 is a diagram illustrating a help menu screen.

FIG. 6 illustrates an example of the help menu screen displayed on the terminal apparatus 12. A print help button 60, a scan help button 62, and a Wi-Fi connection help button 64 are displayed on a help menu screen 58, as an example. If the print help button 60 is pressed by the user, the help file indicating the explanation of the operation when a print process is executed using the terminal apparatus 12 is displayed on a display device that is to display the help file (the image forming apparatus 10 or the terminal apparatus 12). Specifically, explanation about selection of image data to be printed, explanation about transmission of image data to the image forming apparatus 10, explanation about settings of printing conditions, and the like are displayed. If the scan help button 62 is pressed by the user, a help file indicating the explanation of the operation when the scan process is executed using the terminal apparatus 12 is displayed on a display device that is to display the help file. Specifically, explanation about settings of scan conditions, explanation about transmission of image data from the image forming apparatus 10 to the terminal apparatus 12, and the like are displayed. If the Wi-Fi connection help button 64 is pressed by the user, a help file indicating the explanation of the operation the image forming apparatus 10 is connected using Wi-Fi is displayed on a display device that is to display the help file. It is noted that the help menu screen 58 illustrated in FIG. 6 is only an example. The help menu screen 58 may be configured to display a help file regarding another function (process).

Figure 7:
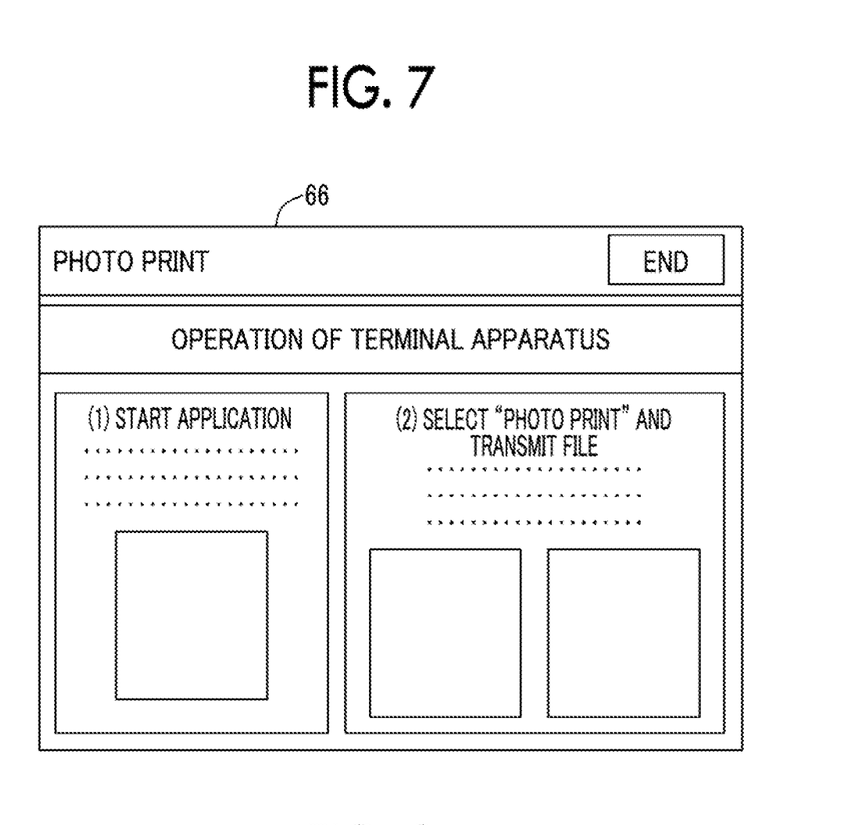
FIG. 7 is a diagram illustrating a help screen.

Hereinafter, a help screen displayed on the image forming apparatus 10 will be described, with reference to FIG. 7. FIG. 7 illustrates an example of the help screen. A help screen 66 is a screen displayed on the UI unit 22 of the image forming apparatus 10, as an example, when performing the print process by using the terminal apparatus 12. Explanation of operations (steps) that are to be performed on the terminal apparatus 12 when the print process is executed is displayed on the help screen 66.

Figure 8:
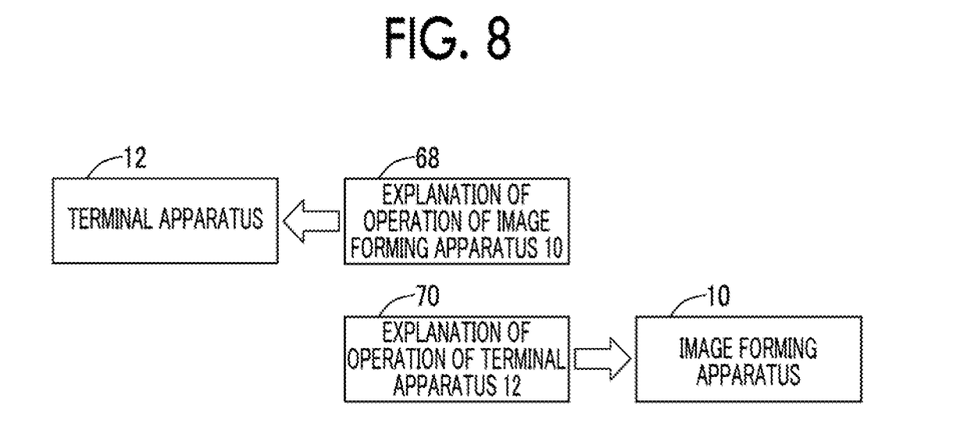
FIG. 8 is a diagram illustrating an outline of a process performed by the image forming system according to the present exemplary embodiment.

Hereinafter, the process performed by the image forming system according to the present exemplary embodiment will be described. At first, an outline of the process will be described with reference to FIG. 8. In this exemplary embodiment, a display device displaying the explanation portion is changed, according to the contents of the description in the help file. Specifically, as illustrated in FIG. 8, an explanation portion 68 indicating explanation of the operation on the image forming apparatus 10 is displayed on the terminal apparatus 12, and an explanation portion 70 indicating explanation of the operation on the terminal apparatus 12 is displayed on the image forming apparatus 10.

Figure 9:
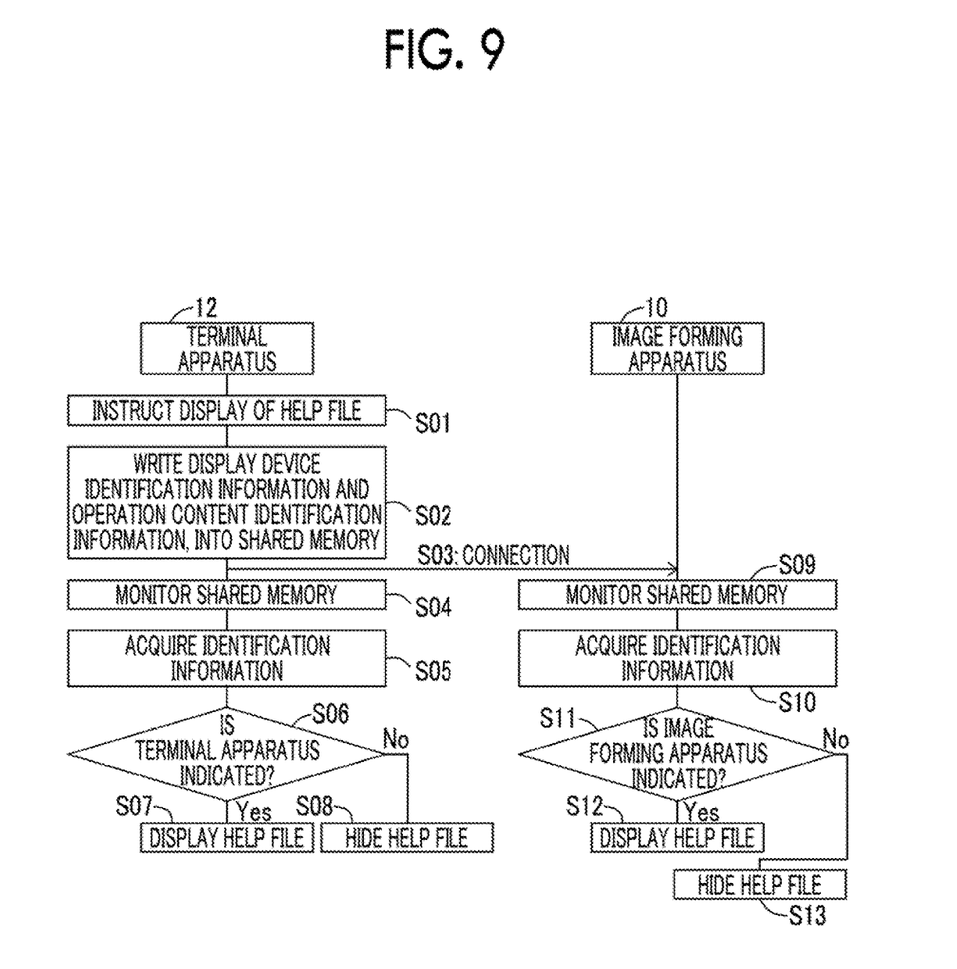
FIG. 9 is a flowchart illustrating a process performed by the image forming system according to the present exemplary embodiment.

Next, details of a process performed by the image forming system will be described with reference to FIG. 9. FIG. 9 illustrates a flowchart illustrating the process. In the example illustrated in FIG. 9, it is assumed that the user operates the terminal apparatus 12.

At first, the user instructs the display of a help file, by using the UI unit 34 of the terminal apparatus 12 (S01). For example, in a state where the operation screen about the print process is displayed on the UI unit 34, an instruction to display the help file is given. For example, the help button is displayed on the operation screen, and the user presses the button, thereby giving an instruction to display the help file.

Next, the storage control unit 38 of the terminal apparatus 12 specifies the explanation portion corresponding to the operation screen that is displayed on the UI unit 34 (the operation content corresponding to the operation screen), in the help file that is stored in the storage unit 32, and acquires display device identification information associated with the explanation portion (identification information indicating a display device that is to display the explanation portion) from the help file. Then, the storage control unit 38 writes into the shared memory 14 the operation content identification information (operation screen identification information) indicating the operation content corresponding to the operation screen that is displayed on the UI unit 34 and the display device identification information which is acquired from the help file, in association with each other (S02).

Next, the terminal apparatus 12 is connected to the image forming apparatus 10 through the communication path N (S03).

Next, the display control unit 40 of the terminal apparatus 12 monitors the shared memory 14 (S04), acquires the display device identification information and the operation content identification information, which are stored in the shared memory 14 (S05), and refers to the display device identification information.

In a case where the display device identification information indicates the terminal apparatus 12 (own apparatus; Yes at S06), the display control unit 40 of the terminal apparatus 12 refers to the operation content identification information associated with the display device identification information and displays on the UI unit 34 the explanation portion (such as a page, a chapter, or a section in the help file) which is in the help file stored in the storage unit 32 and which is associated with the operation content identification information (S07).

Meanwhile, in a case where the display device identification information does not indicate the terminal apparatus 12 (own apparatus; No at S06), the help file is not displayed on the terminal apparatus 12 (S08).

Furthermore, after communication between the terminal apparatus 12 and the image forming apparatus 10 is established, the display control unit 28 of the image forming apparatus 10 monitors the shared memory 14 (S09), acquires the display device identification information and the operation content identification information, which are stored in the shared memory 14 (S10), and refers to the display device identification information.

In a case where the display device identification information indicates the image forming apparatus 10 (own apparatus; Yes at S11), the display control unit 28 of the image forming apparatus 10 refers to the operation content identification information associated with the display device identification information and displays on the UI unit 22 of the image forming apparatus 10 the explanation portion which is in the help file stored in the storage unit 20 and which is associated with the operation content identification information (pages, chapters, sections, and the like in the help file) (S12).

Meanwhile, in a case where the display device identification information does not indicate the image forming apparatus 10 (own apparatus; No at S11), the help file is not displayed on the image forming apparatus 10 (S13).

Figure 10:
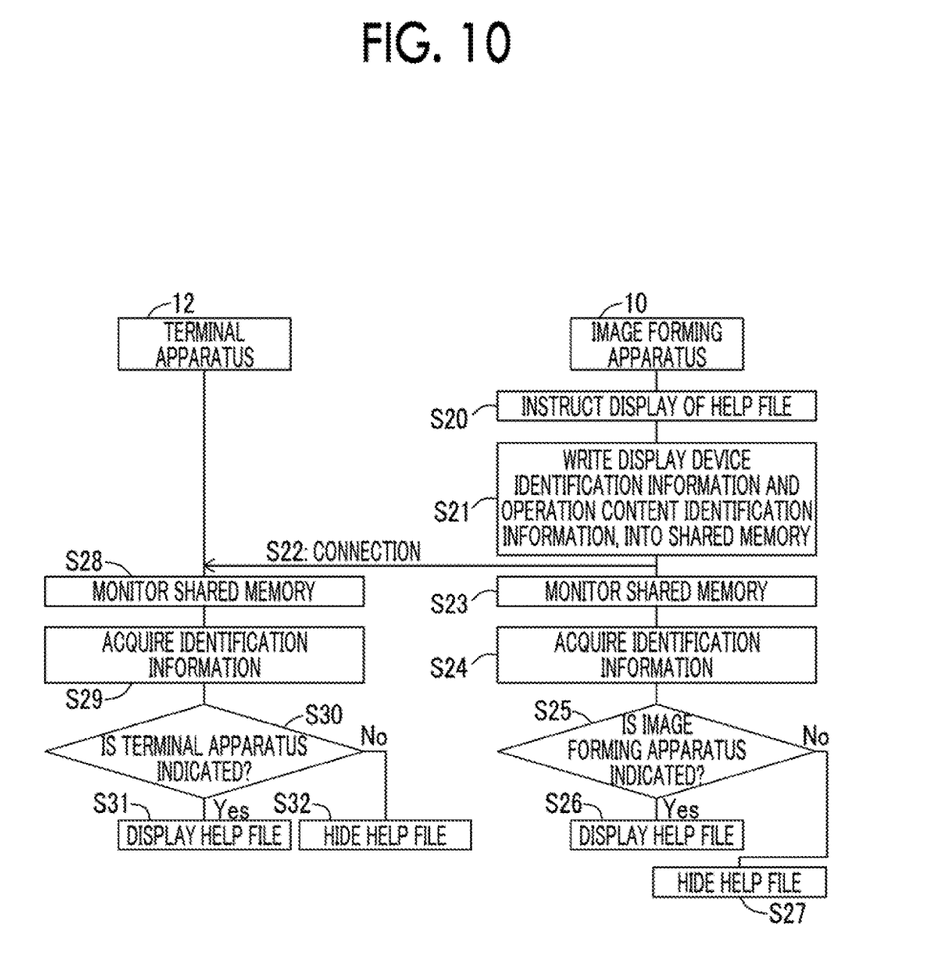
FIG. 10 is a flowchart illustrating a process performed by the image forming system according to the present exemplary embodiment.

Hereinafter, another example of processes performed by the image forming system will be described with reference to FIG. 10. FIG. 10 illustrates a flowchart illustrating the process. In the example illustrated in FIG. 10, it is assumed that the user operates the image forming apparatus 10.

At first, the user instructs the display of a help file, by using the UI unit 22 of the image forming apparatus 10 (S20). For example, in a state where the operation screen regarding the scan transfer process is displayed on the UI unit 22, an instruction to display the help file is given. For example, the help button is displayed on the operation screen, and the user presses the button, thereby giving an instruction to display the help file.

Next, the storage control unit 26 of the image forming apparatus 10 specifies the explanation portion corresponding to the operation screen that is displayed on the UI unit 22 (the operation content corresponding to the operation screen), in the help file stored in the storage unit 20, and acquires display device identification information associated with the explanation portion (identification information indicating a display device that is to display the explanation portion) from the help file. Then, the storage control unit 26 writes into the shared memory 14 the operation content identification information (operation screen identification information) indicating the operation content corresponding to the operation screen that is displayed on the UI unit 22 and the display device identification information which is acquired from the help file, in association with each other (S21).

Next, the image forming apparatus 10 is connected to the terminal apparatus 12 through the communication path N (S22).

Next, the display control unit 28 of the image forming apparatus 10 monitors the shared memory 14 (S23), acquires the display device identification information and the operation content identification information, which are stored in the shared memory 14 (S24), and refers to the display device identification information.

In a case where the display device identification information indicates the image forming apparatus 10 (own apparatus; Yes at S25), the display control unit 28 of the image forming apparatus 10 refers to the operation content identification information associated with the display device identification information and displays on the UI unit 22 the explanation portion which is in the help file stored in the storage unit 20 and which is associated with the operation content identification information (pages, chapters, sections, and the like in the help file) (S26).

Meanwhile, in a case where the display device identification information does not indicate the image forming apparatus 10 (own apparatus; No at S25), the help file is not displayed on the image forming apparatus 10 (S27).

Furthermore, after communication between the image forming apparatus 10 and the terminal apparatus 12 is established, the display control unit 40 of the terminal apparatus 12 monitors the shared memory 14 (S28), acquires the display device identification information and the operation content identification information, which are stored in the shared memory 14 (S29), and refers to the display device identification information.

In a case where the display device identification information indicates the terminal apparatus 12 (own apparatus; Yes at S30), the display control unit 40 of the terminal apparatus 12 refers to the operation content identification information associated with the display device identification information and displays on the UI unit 34 of the terminal apparatus 12 an explanation portion which is in the help file stored in the storage unit 32 and which is associated with the operation content identification information (such as a page, a chapter, or a section in the help file) (S31).

Meanwhile, in a case where the display device identification information does not indicate the terminal apparatus 12 (own apparatus; No at S30), the help file is not displayed on the terminal apparatus 12 (S32).

In addition, the display device identification information and the operation content identification information, which are stored in the shared memory 14, may be deleted after a pre-set period of time has elapsed from the time they are stored in the shared memory 14, or may be deleted after they are acquired by both the image forming apparatus 10 and the terminal apparatus 12.

Figure 11:
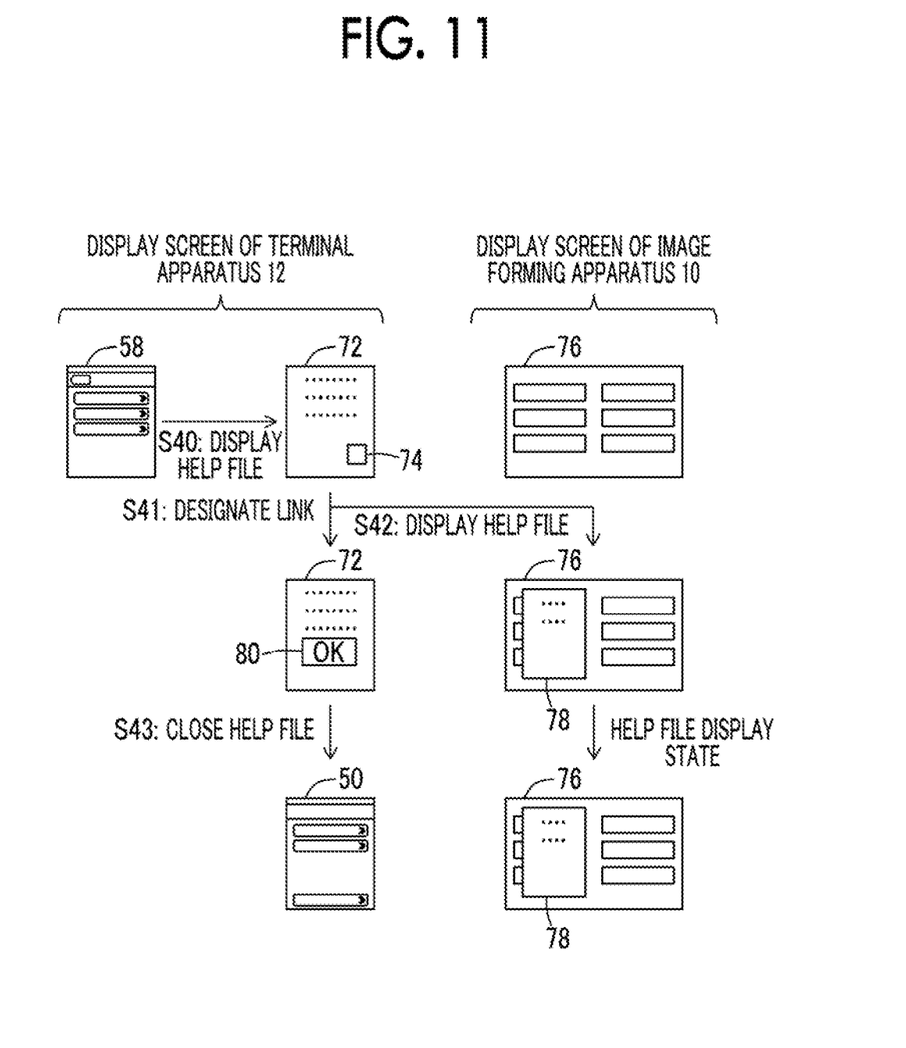
FIG. 11 is a diagram illustrating how the screens of the image forming apparatus and the terminal apparatus transition.

Hereinafter, a specific example of a process performed by the image forming system will be described with reference to FIG. 11. FIG. 11 illustrates how the screen of the image forming apparatus 10 and the screen of the terminal apparatus 12 transition. In the example illustrated in FIG. 11, it is assumed that the user operates the terminal apparatus 12.

For example, if the help button 56 on the menu screen 50 is pressed by the user in a state where the menu screen 50 illustrated in FIG. 5 is displayed on the UI unit 34 of the terminal apparatus 12, the help menu screen 58 is displayed on the UI unit 34 (see FIG. 6). If, for example, the print help button 60 on the help menu screen 58 is pressed by the user, an instruction to display a help file regarding a print process is given. In this case, the display control unit 40 of the terminal apparatus 12 displays on the UI unit 34 an explanation portion 72 (such as a page, a chapter, or a section in the help file) in the help file, for which display is instructed (S40). For example, a link button 74 is provided on the explanation portion 72. The link button 74 is a button for giving an instruction to display an explanation portion indicating explanation of a next operation.

Meanwhile, a main menu screen 76 is displayed on the UI unit 22 of the image forming apparatus 10. An instruction to execute various processes such as the copy process, the print process, the scan process, and the help file display process is received on the main menu screen 76.

Next, if the user presses the link button 74 in the explanation portion 72 by using the UI unit 34 of the terminal apparatus 12 (S41), an instruction to display the explanation portion indicating explanation of a next operation is given. In this case, the storage control unit 38 of the terminal apparatus 12 writes into the shared memory 14 the operation content identification information (operation screen identification information) indicating the operation content corresponding to the operation screen that is displayed on the UI unit 34 and the display device identification information associated with the following explanation portion (identification information indicating a display device that is to display the explanation portion of the display target), in association with each other.

In the example illustrated in FIG. 11, the following explanation portion of the link destination is assumed to be information indicating explanation of an operation on the terminal apparatus 12. Therefore, a display device that is to display the following explanation portion is the image forming apparatus 10, and the following explanation portion in the help file is associated with the display device identification information that indicates the image forming apparatus 10.

Next, the terminal apparatus 12 is connected to the image forming apparatus 10 through the communication path N. The display control unit 40 of the terminal apparatus 12 monitors the shared memory 14, acquires the display device identification information and the operation content identification information, which are stored in the shared memory 14, and refers to the display device identification information. Furthermore, after communication between the terminal apparatus 12 and the image forming apparatus 10 is established, the display control unit 28 of the image forming apparatus 10 monitors the shared memory 14, acquires the display device identification information and the operation content identification information, which are stored in the shared memory 14, and refers to the display device identification information.

As described above, a display device that is to display the following explanation portion of the link destination is the image forming apparatus 10. Therefore, the display control unit 28 of the image forming apparatus 10 displays, on the UI unit 22 of the image forming apparatus 10, an explanation portion 78 (the following explanation portion of the link destination) which is in the help file stored in the storage unit 20 of the image forming apparatus 10 and which is associated with the operation content identification information (S42). For example, the explanation portion 78 is superimposed and displayed on the main menu screen 76. Explanation of an operation on the terminal apparatus 12 is described in the explanation portion 78.

Meanwhile, the display control unit 40 of the terminal apparatus 12 displays notification information on the UI unit 34 of the terminal apparatus 12. The notification information is information for notifying the user of the terminal apparatus 12 that, for example, the help file is displayed on another device. The display control unit 40 displays, for example, a notification window 80 as an example of the notification information, on the UI unit 34. The notification window 80 is information for notifying the user of display switching of the help file. For example, an OK button is provided in the notification window 80. If the OK button is pressed by the user, the display control unit 40 of the terminal apparatus 12 closes the help file that is displayed on the UI unit 34 of the terminal apparatus 12 (the explanation portion 72 in FIG. 11) (S43). Thus, information before the help file is displayed is displayed on the UI unit 34. For example, the menu screen 50 is displayed on the UI unit 34. In addition, in a case where the link button 74 is pressed by the user, the help file is automatically closed without the notification window 80 being displayed, and thus the information before the help file is displayed may be displayed on the UI unit 34.

The following explanation portion 78 of the link destination (help file) is displayed continuously on the UI unit 22 of the image forming apparatus 10.

As described above, a help file indicating the explanation of the operation on the terminal apparatus 12 is displayed on the image forming apparatus 10, without being displayed on the terminal apparatus 12. Thus, the operation, which is the target of the explanation, on the terminal apparatus 12 is not blocked by the help file. For example, a menu screen, an operation screen for instructing the print process, an operation screen for instructing the scan process, and the like are displayed on the terminal apparatus 12, and it is possible to prevent the operation through the operation screens from being blocked by the help file.

A specific example will be described below. If an instruction to display a help file regarding a print process is given in a state where the operation screen for instructing the print process is displayed on the terminal apparatus 12, the help file indicating the explanation of the operation to be performed on the terminal apparatus 12 with respect to the print process is displayed on the image forming apparatus 10. Thus, since the operation screen is not blocked by the help file, as compared with the case of displaying on the terminal apparatus 12 a help file that indicates the explanation of the operation on the terminal apparatus 12, the operation by the user is facilitated.

There is a limit in the size of the screen of the UI unit 34 of the terminal apparatus 12. Therefore, there may be a case that when a help file that indicates the explanation of the operation on the terminal apparatus 12 is displayed on the UI unit 34 of the terminal apparatus 12, the help file is superimposed and displayed on the operation screen. In this case, the operation screen is blocked by the help file, and it is difficult for the user to perform the operation. Alternatively, the help file needs to be closed in order to perform the operation. In this case, the user cannot perform the operation while referring to the help file. According to the present exemplary embodiment, it is possible to prevent the operation screen from being blocked by the help file, and there is no need to close the help file in order to perform the operation.

Figure 12:
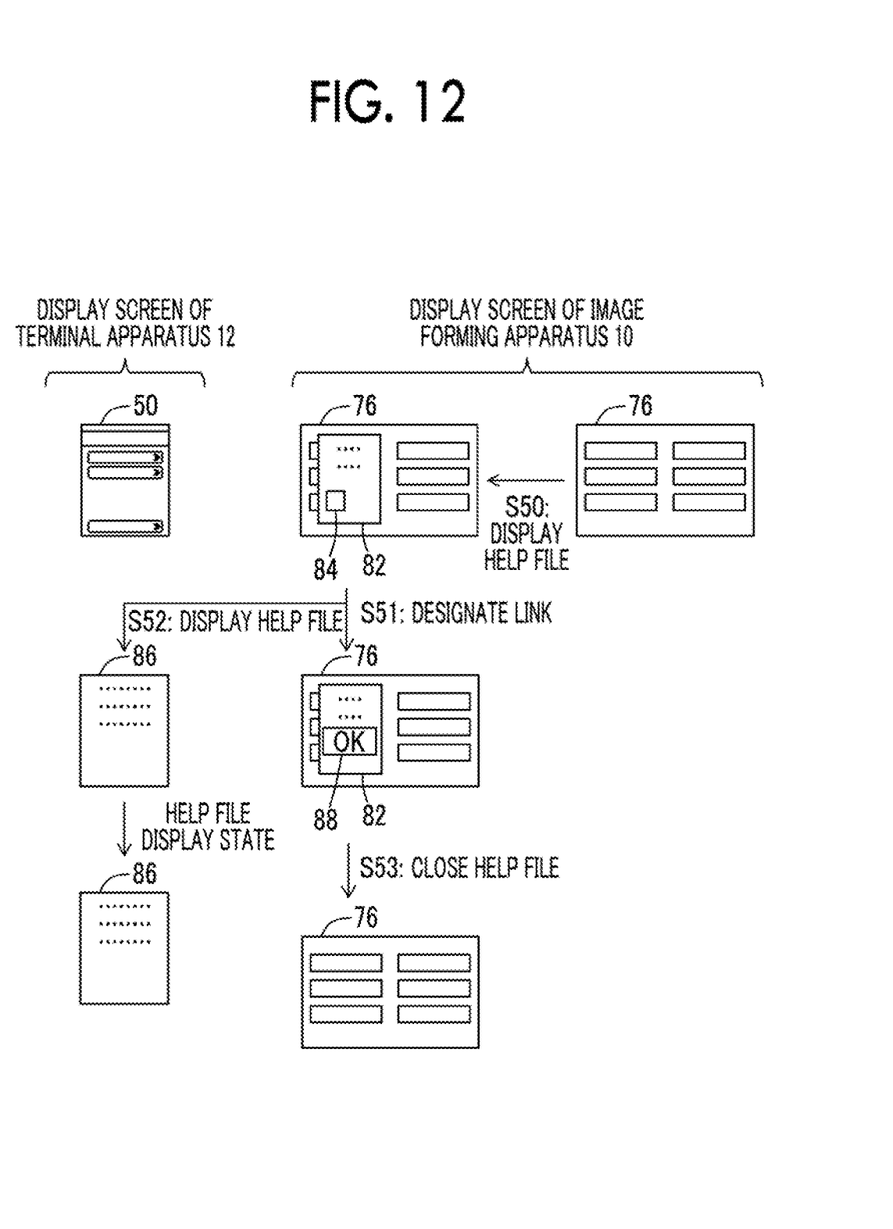
FIG. 12 is a diagram illustrating how the screens of the image forming apparatus and the terminal apparatus transition.

Hereinafter, another specific example of a process performed by the image forming system will be described with reference to FIG. 12. FIG. 12 illustrates how the screen of the image forming apparatus 10 and the screen of the terminal apparatus 12 transition. In the example illustrated in FIG. 12, it is assumed that the user operates the image forming apparatus 10.

For example, the main menu screen 76 is displayed on the UI unit 22 of the image forming apparatus 10. For example, a help button for giving an instruction to display a help file is provided on the main menu screen 76. If the help button is pressed by the user in the UI unit 22, an instruction to display the help file is given. In this case, the display control unit 28 of the image forming apparatus 10 displays on the UI unit 22 the explanation portion 82 (such as a page, a chapter, or a section in the help file) in the help file, for which display is instructed (S50). For example, the explanation portion 22 as superimposed and displayed on the main menu screen 76. For example, a link button 84 is provided on the explanation portion 82. The link button 84 is a button for giving an instruction to display an explanation portion indicating the explanation of the next operation.

Meanwhile, the menu screen 50 is displayed on the UI unit 34 of the terminal apparatus 12.

Next, if the user presses the link button 84 in the explanation portion 82 by using the UI unit 22 of the image forming apparatus 10 (S51), an instruction to display the explanation portion indicating the explanation of the next operation is given. In this case, the storage control unit 26 of the image forming apparatus 10 writes into the shared memory 14 the operation content identification information (operation screen identification information) indicating the operation content corresponding to the operation screen that is displayed on the UI unit 22 and the display device identification information associated with the following explanation portion (identification information indicating a display device that is to display the explanation portion of the display target), in association with each other.

In the example illustrated in FIG. 12, the following explanation portion of the link destination is assumed to be information indicating a explanation of an operation on the image forming apparatus 10. Therefore, a display device that is to display the following explanation portion is the terminal apparatus 12, and the following explanation portion in the help file is associated with the display device identification information that indicates the terminal apparatus 12.

Next, the image forming apparatus 10 is connected to the terminal apparatus 12 through the communication path N. The display control unit 28 of the image forming apparatus 10 monitors the shared memory 14, acquires the display device identification information and the operation content identification information, which are stored in the shared memory 14, and refers to the display device identification information. Furthermore, after communication between the image forming apparatus 10 and the terminal apparatus 12 is established, the display control unit 40 of the terminal apparatus 12 monitors the shared memory 14, acquires the display device identification information and the operation content identification information, which are stored in the shared memory 14, and refers to the display device identification information.

As described above, a display device that is to display the following explanation portion of the link destination is the terminal apparatus 12. Therefore, the display control unit 40 of the terminal apparatus 12 displays on the UI unit 34 of the terminal apparatus 12 an explanation portion 36 (the following explanation portion of the link destination) which is an explanation portion in the help file stored in the storage unit 32 of the terminal apparatus 12 and which is associated with the operation content identification information (S52). The explanation of an operation on the image forming apparatus 10 is described in the explanation portion 86.

Meanwhile, the display control unit 28 of the image forming apparatus 10 displays notification information on the UI unit 22 of the image forming apparatus 10. The notification information is information for notifying the user of the image forming apparatus 10 that, for example, the help file is displayed on another device. The display control unit 28 displays, for example, a notification window 88 as an example of the notification information, on the UI unit 22 of the image forming apparatus 10. The notification window 88 is information for notifying the user of the display switching of the help file. For example, an OK button is provided in the notification window 88. If the OK button is pressed by the user, the display control unit 28 of the image forming apparatus 10 closes the help file that is displayed on the UI unit 22 of the image forming apparatus 10 (the explanation portion 82 in FIG. 12) (S53). Thus, information before the help file is displayed is displayed on the UI unit 22. For example, the main menu screen 76 is displayed on the UI unit 22. In addition, in a case where the link button 84 is pressed by the user, without the notification window 88 being displayed, the help file is automatically closed, and thus the information before the help file is displayed may be displayed on the UI unit 22.

The following explanation portion 86 of the link destination (help file) is displayed continuously on the UI unit 34 of the terminal apparatus 12.

As described above, a help file indicating the explanation of the operation on the image forming apparatus 10 is displayed on the terminal apparatus 12, without being displayed on the image forming apparatus 10. Thus, the operation, which is the target of the explanation, on the image forming apparatus 10 is not blocked by the help file. For example, a menu screen, an operation screen for instructing the print process, an operation screen for instructing the scan process, and the like are displayed on the image forming apparatus 10, and it is possible so prevent the operation through the operation screens from being blocked by the help file. According to the present exemplary embodiment, as compared with the case of displaying on the image forming apparatus 10 a help file that indicates the explanation of the operation on the image forming apparatus 10, the operation by the user is facilitated.

Hereinafter, a specific example of a process in the image forming system will be described with reference to FIG. 13. In a state where a help file 90 is displayed on the terminal apparatus 12, the link button in the help file 90 is pressed by the user (S60). In a case where a display device that is to display the explanation portion of the link destination is the image forming apparatus 10, display device identification information indicating the image forming apparatus 10 and information indicating an operation screen N (display location N) that is displayed on the terminal apparatus 12 are stored in the shared memory 14. The terminal apparatus 12 detects that the display device is the image forming apparatus 10, and closes the help file 90 (S61). Meanwhile, the image forming apparatus 10 detects that the display device belongs to the own apparatus, and displays a help file 92 for the operation screen N (display location N) (S62). Next, the link button in the help file 92 that is displayed on the image forming apparatus 10 is pressed by the user (S63). In a case where the display device that is to display the explanation portion of the link destination is the terminal apparatus 12, display device identification information indicating the terminal apparatus 12 and information indicating an operation screen M (display location M) that is displayed on the image forming apparatus 10 are stored in the shared memory 14. The image forming apparatus 10 detects that the display device is the terminal apparatus 12, and closes the help file (S64). Meanwhile, the terminal apparatus 12 detects that the display device belongs to the own apparatus, and displays a help file 94 for the operation screen M (display location M) (S65).

Figure 13:
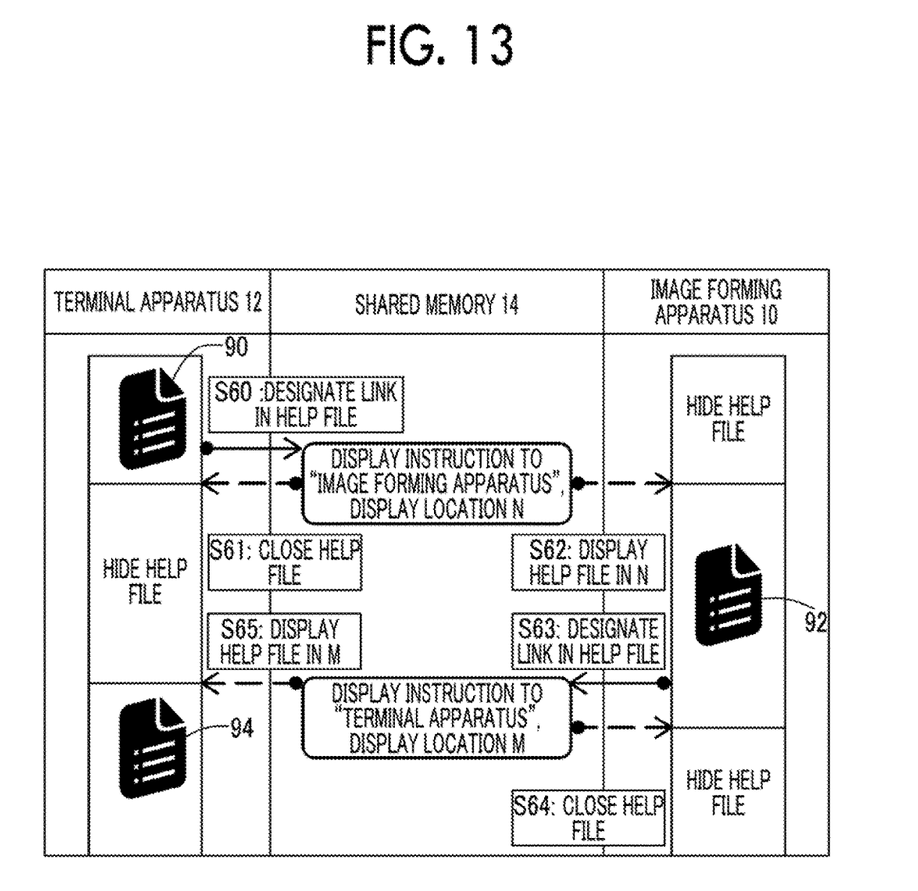
FIG. 13 is a diagram illustrating a process performed by the image forming system according to the present exemplary embodiment.

In FIG. 13, a period in which "Hide help file" is displayed is a period in which a help file is not displayed. For example, a period in which "Hide help file" is displayed on the image forming apparatus 10 is a period in which a help file is not displayed on the image forming apparatus 10, and a period in which "Hide help file" is displayed on the terminal apparatus 12 is a period in which a help file is not displayed on the terminal apparatus 12. Because the help file indicating the explanation of the operation on a certain apparatus is displayed on another apparatus without being displayed on the certain apparatus, a user can perform the operation on the certain apparatus without being interfered with the help file.

As a modification example of the above-mentioned exemplary embodiment, if a explanation portion to be displayed has been changed due to the occurrence of the page feed of the help file or the like, in a case where a help file indicating the explanation of an operation on a first apparatus is displayed on a second apparatus, an operation screen corresponding to a new explanation portion (help contents) which is displayed on the second apparatus may be displayed on the first apparatus. The first apparatus is one apparatus of the image forming apparatus 10 and the terminal apparatus 12, and the second apparatus is the other apparatus. For example, each explanation portion (for example, pages, chapters, sections, and the like) of the help file and an operation screen are associated with each other in advance. The display device identification information indicating the display device that is to display the help file, and the operation screen identification information indicating the operation screen corresponding to the explanation portion are stored in association with each other in the shared memory 14. The second apparatus displays the explanation portion of the display target by referring to the association, and the first apparatus displays the operation screen corresponding to the explanation portion by referring to the association. For example, the operation screen display button is provided in the help file, and the operation screen is switched by the button being pressed by the user. The button may be provided on each page of the help file, or may be provided near the outer frame in the display screen, outside a help display window, or the like.

The image forming apparatus 10 and the terminal apparatus 12, which are described above, are respectively referred by cooperation of hardware resources and software as an example. Specifically, the image forming apparatus 10 and the terminal apparatus 12 are respectively provided with a processor such as a CPU which is not illustrated. The functions of the respective units of the image terming apparatus 10 and the terminal apparatus 12 are realised, by the processor reading and executing the program stored in the storage device which is not illustrated. The above program is stored in the storage device through a recording medium such as a CD or a DVD, or through a communication path such as a network. Alternatively, the respective units of the image forming apparatus 10 and the terminal apparatus 12 may be implemented, for example, by using hardware resources such as a processor or an electronic circuit. In the implementation, a device such as a memory may be used. As another example, the respective units may be realized by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that, the scope of the invention be defined by the following claims and their equivalents.

What is claimed is:

1. An information processing system comprising:
    a first display unit on an image forming apparatus, the first display unit controlled by a first controller;
    a second display unit controlled by a second controller; and
    a shared memory that is accessible by the first controller and the second controller and stores a plurality of operating instruction information including first operating instruction information indicating explanation of an operation and second operating instruction information indicating explanation of a next operation, the first operating instruction information being stored in the shared memory in association with first device identification information which designates the first display unit to display the first operating instruction information, and the second operating instruction information being stored in the shared memory in association with second device identification information which designates the second display unit to display the second operating instruction information,
    wherein if the first display unit that displays the first operating instruction information receives an instruction to display the second operating instruction information:
    the second controller displays the second operating instruction information on the second display unit in accordance with the second device identification information stored in the shared memory, and
    the first controller hides the first operating instruction information that is displayed on the first display unit without displaying the second operating instruction information on the first display unit in accordance with the second device identification information stored in the shared memory, such that a first operation screen relating to the second operating instruction information is not blocked on the first display unit.

2. The information processing system according to claim 1, wherein notification information is sent, which indicates that the second operating instruction information is displayed on the second display unit, and upon receiving from a user a response to the notification information that is sent, the first controller hides the first operating instruction information.

3. The information processing system according to claim 2, wherein if a display target portion in the second operating instruction information is changed in the second display unit, the first controller displays on the first display unit a second operation screen corresponding to the display target portion after the change.

4. The information processing system according to claim 1, wherein if a display target portion in the second operating instruction information is changed in the second display unit, the first controller displays on the first display unit a second operation screen corresponding to the display target portion after the change.

* * * * *